United States Patent
Liu et al.

(10) Patent No.: US 11,726,762 B2
(45) Date of Patent: Aug. 15, 2023

(54) METHOD OF AND DEVICES FOR PERFORMING AN OVER-THE-AIR, OTA, UPGRADE IN A NETWORK OF COMMUNICATIVELY INTERCONNECTED DEVICES

(71) Applicant: SIGNIFY HOLDING B.V., Eindhoven (NL)

(72) Inventors: Xiaoqi Liu, Eindhoven (NL); Shouzhen Lan, Eindhoven (NL); Dunfa Chen, Eindhoven (NL); Junxi Wu, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 31 days.

(21) Appl. No.: 16/982,929

(22) PCT Filed: Mar. 21, 2019

(86) PCT No.: PCT/EP2019/057095
§ 371 (c)(1),
(2) Date: Sep. 21, 2020

(87) PCT Pub. No.: WO2019/180146
PCT Pub. Date: Sep. 26, 2019

(65) Prior Publication Data
US 2021/0011705 A1    Jan. 14, 2021

(30) Foreign Application Priority Data

Mar. 23, 2018 (WO) ................ PCT/CN2018/080220
Sep. 4, 2018 (EP) ..................................... 18192519

(51) Int. Cl.
*G06F 8/65* (2018.01)
*H04L 61/5046* (2022.01)
(Continued)

(52) U.S. Cl.
CPC ............ *G06F 8/65* (2013.01); *H04L 61/5046* (2022.05); *H04L 67/34* (2013.01); *H04L 69/28* (2013.01);
(Continued)

(58) Field of Classification Search
CPC . H04L 61/6072; H04L 61/6022; H04L 69/40; H04L 69/28; H04L 67/34; H04L 61/2046; G06F 8/65
See application file for complete search history.

(56) References Cited

U.S. PATENT DOCUMENTS 9,560,007 B2   1/2017  Watanabe
9,706,582 B2   7/2017  Kim et al.
(Continued)

FOREIGN PATENT DOCUMENTS

CN    103973502 A    8/2014
CN    105225449 A    1/2016
(Continued)

*Primary Examiner* — S. Sough
*Assistant Examiner* — Cheneca Smith

(57) ABSTRACT

A method (50) of and a server (19) and network node or client devices (3, 5) communicatively interconnected in a network (1) and arranged for over-the-air, OTA, data upgrade or update of client devices. In the event of a timeout (54) at the server (19) waiting for a response or request message from a selected OTA client (5) during an ongoing OTA data upgrade, the OTA server (19) checks whether a network address change (51) of the selected OTA client (5) caused the OTA server to timeout.

13 Claims, 10 Drawing Sheets

(51) Int. Cl.
*H04L 67/00* (2022.01)
*H04L 69/28* (2022.01)
*H04L 69/40* (2022.01)
*H04L 101/622* (2022.01)
*H04L 101/672* (2022.01)

(52) U.S. Cl.
CPC ........ *H04L 69/40* (2013.01); *H04L 2101/622* (2022.05); *H04L 2101/672* (2022.05)

(56) References Cited

U.S. PATENT DOCUMENTS

| | | | |
|---|---|---|---|
| 2003/0069008 A1 | 4/2003 | Nakazawa et al. | |
| 2003/0212772 A1* | 11/2003 | Harris | H04L 61/2514 709/245 |
| 2006/0075276 A1* | 4/2006 | Kataria | G06F 11/1433 714/47.1 |
| 2008/0013474 A1 | 1/2008 | Nagarajan et al. | |
| 2008/0288654 A1 | 11/2008 | Matuszewski et al. | |
| 2013/0031226 A1* | 1/2013 | Liverance | H04L 67/34 709/221 |
| 2013/0145356 A1* | 6/2013 | Ranjan | G06F 21/57 717/170 |
| 2013/0149966 A1 | 6/2013 | Lee et al. | |
| 2014/0211658 A1 | 7/2014 | Fan | |
| 2017/0039372 A1* | 2/2017 | Koval | G01R 22/06 |
| 2017/0339095 A1* | 11/2017 | Lei | H04L 67/12 |
| 2017/0364348 A1* | 12/2017 | Klitenik | H05B 45/12 |
| 2018/0115435 A1 | 4/2018 | George et al. | |

FOREIGN PATENT DOCUMENTS

| | | |
|---|---|---|
| CN | 108449198 A | 8/2018 |
| KR | 20080047857 A | 5/2008 |

\* cited by examiner

METHOD OF AND DEVICES FOR PERFORMING AN OVER-THE-AIR, OTA, UPGRADE IN A NETWORK OF COMMUNICATIVELY INTERCONNECTED DEVICES

CROSS-REFERENCE TO PRIOR APPLICATIONS

This application is the U.S. National Phase application under 35 U.S.C. § 371 of International Application No. PCT/EP2019/057095, filed on Mar. 21, 2019, which claims the benefits of European Patent Application No. 18192519.9, filed on Sep. 4, 2018 and Chinese Patent Application No. PCT/CN2018/080220, filed on Mar. 23, 2018. These applications are hereby incorporated by reference herein.

TECHNICAL FIELD

The present disclosure generally relates to communication and control in a network of communicatively interconnected devices and, in particular, to over-the-air, OTA, upgrade or update of such devices in a large scale mesh network for use in various different applications for home, office, retail, hospitality and industry, for example.

BACKGROUND

Wireless Mesh Networks, WMNs, Wireless Personal Area Networks, WPANs, or in general communication networks comprised of a plurality of communicatively interconnected devices, generally comprise multiple network end nodes, network relay nodes, such as bridges, switches and other electric infrastructure devices and equipment. These node devices are generally controlled by at least one network control or coordinator device, which may provide access to other networks and the Internet, for example. Such a network control or coordinator device is generically called a gateway device.

Examples of such communication devices are Customer-Premises Equipment, CPE, for example lighting devices having communication capabilities, Internet of Things, IoT, devices, and User Equipment, UE, for mobile telephone and data communication. Network protocols for exchanging data by networked devices or nodes are generally available and known as ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (based systems).

The devices may communicate in either one of unicast mode and broadcast mode, using the Bluetooth Low Energy, BLE, mesh protocol or the ZigBee protocol, for example. A so-called combo-node device, with both ZigBee and BLE connectivity, may operate as a temporal bridging node between a mobile phone and a ZigBee-based lighting network, for example.

ZigBee networks represent a type of a low-power/low-cost wireless networks which allow multi-hop communication among devices in a mesh topology. ZigBee devices offer reduced power consumption and cost, together with mesh networking capability, which make them suitable for use in large-scale deployments. Typical application examples of ZigBee mesh networks include home automation, building automation, retail services, smart energy, and wireless indoor lighting systems.

Commissioning of a network and its devices is a process in which a new network is set up after installation and testing of the node devices, the gateway equipment and communication facilities of the network, according to design objectives or specifications, or when new device is added to an existing network.

In a ZigBee network, for example, after commissioning of the network, every node broadcasts a device announce packet or message, comprising address information of a respective node, such as its specific network address and/or Media Access Control, MAC, address. The MAC address of a device is a unique identifier assigned to a Network Interface Controller, NIC, of the device for communications at the data link layer of the network. With the device announce packet, the network gateway device receives address information of a respective node in a network for communication and control purposes, also called the short address, and a network key may be obtained used to encrypt communication between devices in the network.

Smart electric or electronic devices, such as smart lighting devices in a ZigBee network, for example, usually have embedded software inside and often need to upgrade or update their software for several times during their whole life cycle. When the devices are installed in end users' sites, the most convenient way to upgrade or update them is to perform over-the-air, OTA, upgrade. In ZigBee, the products' ZigBee channel may be used to transmit the upgrade or update file or upgrade or update data to the devices, for example.

In practice, software upgrade or update is performed by an OTA server operatively connected to the network. Such an OTA server normally resides in the gateway device of the network, however such a server may also operate remote from the network or gateway. Generally, in case of an OTA upgrade, the network devices that require upgrade or update are called client devices. In the present description and the claims, the term node device or in short node and client device or in short client are generic for all the devices connected in a WMN, a WPAN, or any network of communicatively interconnected communication devices.

In a ZigBee enabled network and devices, for example, prior to the start of an OTA, the OTA server builds an OTA list. The OTA list comprises the network addresses of all candidate OTA clients that may require upgrade or update. Next, the OTA server broadcasts notification messages to the entire network, to notify all candidate OTA clients that an OTA is going to start.

OTA starts in that the OTA server selects a respective OTA client by transmitting a notification message based on the network address of that OTA client. This notification message is preferably exchanged in a unicast mode of operation. After receiving the notification message, the addressed OTA client requests data from the OTA server and the server replies the request with data blocks or data packages comprising the upgrade or update information. The OTA data blocks or packages are exchanged in a broadcast mode of operation, such that all other OTA clients can receive them too.

Once the respective OTA client has received all the upgrade or update data, the OTA client transmits a message informing the OTA server that the client has received all data of the upgrade file and the upgrade to this OTA client is completed.

Next, the OTA server selects another OTA client by transmitting a respective notification message based on the network address of this other OTA client. Because this other OTA client has already received many data blocks or data packets from the broadcast of the upgrade data or update data by the OTA server to the previous OTA client, the other OTA client now only requests possible missing data blocks or data packets from the OTA server. If this other client has no missing data blocks, it will immediately transmit a message informing the OTA server that the client has received all data of the upgrade file, and the upgrade to this OTA client is completed. As all the candidate OTA clients receive broadcasted OTA data, the OTA upgrade illustrated above is also called a fast OTA.

The OTA server repeats the transmission of a notification message addressed to all other candidate OTA clients from the list, one after the other, till the OTA server has received messages from all OTA clients informing the OTA server that all OTA clients have received the upgrade file, and the upgrade to all the OTA clients may be completed.

In a large ZigBee network, an OTA upgrade is usually performed in a broadcast data exchange mode, for the network as a whole. This, because a step-by-step complete OTA for each single node or client device, in unicast mode for example, will take far too much time, such as up to 1000 minutes, for example.

SUMMARY

During an ongoing upgrade, that is from the building of the list of candidate OTA clients by the OTA server, an OTA client's network address, such as the ZigBee short address, may get changed. Such a network address change may be caused, for example, if there is any address conflict between two node devices in a large network. Generally, after the client's network address changes, the client broadcasts its new or current network address in a device announce packet or message, as mentioned above in respect of the commissioning of the network and its devices. In particular in large scale networks, the OTA server may not receive the message because exchange of messages by broadcasting in the network is unreliable, especially when there is much OTA traffic in the network, for example. Hence the OTA server is kept unknown of the new short address and, eventually, the OTA upgrade process may fail, as the OTA server and the OTA client are not able to communicate with each other anymore. The OTA server may restart the OTA upgrade from the beginning if OTA upgrade fails.

An OTA upgrade failure may also arise from a client or node reset during an ongoing OTA upgrade. Then, the whole fast OTA will be delayed as this node will perform an OTA upgrade from the start, because the data packets that are recorded during an OTA broadcast by the server in respect of an other client may be lost as a consequence of the client reset. Also in the case of a power interruption or power glitches that a client may encounter, as the outdoor environment in a mesh network is quite tough, fast OTA upgrade may fail for a particular client or clients.

In general, any event that may cause a reboot of a client device can cause an OTA upgrade failure.

Accordingly, there is a need for handling an ongoing OTA upgrade or update of a client device in case of a failure of an OTA upgrade or update of a particular client or clients by a an OTA server in a network of communicatively interconnected OTA clients.

The above mentioned and other objects are achieved, in a first aspect of the present disclosure, by a method of performing an over-the-air, OTA, upgrade by a server in a network of communicatively interconnected client devices, wherein the server transmits a network address querying message if an ongoing OTA upgrade of a client device causes a timeout at the server, and wherein the server resumes the OTA upgrade of the client device after the server receives a network address reporting message of the client device comprising its current network address.

In accordance with the present disclosure, the OTA upgrade server, in case of a time out in an ongoing OTA upgrade, attempts to restore the OTA upgrade by checking whether a network address change of the client server may have caused failure of the OTA upgrade.

In case of a network address change of a client device, the client device may not receive an OTA upgrade notification message transmitted by the server, notifying the ongoing OTA upgrade to the client device. Hence, the client device will not respond to the notification message by requesting the server to transmit the data of the OTA upgrade, as a result of which the server eventually experiences a timeout.

A network address change of a client device in an ongoing OTA upgrade may also cause a timeout in the server when receiving a request for transmitting OTA upgrade data from a client device, as the network address in the data request message does not match the network address of the OTA upgrade notification message transmitted by the server. In that case the server assumes likewise not to receive a response from the client device addressed by the OTA upgrade notification message, again causing a timeout at the server.

In general, a timeout at the server in an ongoing upgrade of a client may occur if the server does not receive any expected message of the client, based on the network address of the client, such as a request or message relating to the end of the upgrade, for example, when a client has received all upgrade data.

Hence, by querying, by the server, in accordance with the present disclosure, whether a network address change of the client device may have caused the timeout in the ongoing OTA upgrade, and resuming the OTA upgrade of the client device after the server receives a network address reporting message of the client device comprising its current network address, the OTA upgrade can be continued, and thereby time and resources can be saved compared to having to start the whole OTA upgrade process anew.

In accordance with the present disclosure, the network address querying message transmitted by the server may comprise a Media Access Control, MAC, address or so-called IEEE address of the client device, as a unique identification of the client device. It will be appreciated that any identification of a client device available to the server, other than the MAC or IEEE address of a client device, may be used to identify the client device in the network address querying message.

To make sure that the network address querying message is received by a client device, in accordance with an embodiment of the present disclosure, the said network address querying message is broadcasted by the server in the network.

The network address querying message may be repeated by the server until a maximum number of repeats is exceeded, for example.

In an alternative embodiment in accordance with the present disclosure, the network address querying message transmitted by the server may also take the form of an inquiry message that commands or causes the node or client devices in the network to announce their address information, such as used in commissioning of the network. From the MAC or IEEE address or any other unique identification of a client device included with the network address announce message, the server may identify a particular client device, based on the client or node identification information available to the server form commissioning of the network.

In an embodiment of the present disclosure, the server resumes the OTA upgrade of the client device by transmitting, based on the received current network address of the client device, an OTA upgrade notification message notifying the OTA upgrade to the client device.

To ensure reliability of receipt of the OTA upgrade notification message at the client device, the OTA upgrade notification message, based on the received current network address of the client device, is transmitted from the server to the client device in unicast transmission mode.

The client device, in a network of communicatively interconnected client devices, receiving a network address querying message from the server in an ongoing OTA upgrade, in accordance with a second aspect of the present disclosure, transmits in response to the network address querying message a network address reporting message in the network comprising the current network address of the client device.

When the network address querying message from the server comprises an identification of a client, such as the MAC or IEEE address of the client, only that client device receiving the network address querying message the client identification of which matches the identification of the receiving client device will response to this querying message.

In the network address reporting message a client device may also include its identification, such as its MAC or IEEE identification, from which the server based on the information received at commissioning of the network may link the network address received to the correct client device.

To enhance the probability that the network address reporting message will be received by the OTA server, the network reporting message is transmitted in unicast mode.

To even further enhance receipt of the network address reporting message by the OTA server, in an embodiment according to the present disclosure, the network address reporting message is repeated by the client device until a maximum number of repeats is exceeded.

In particular in a large network, comprising a plurality of node or client devices, a network address change may occur at any stage of an ongoing OTA upgrade, also when already data packets of OTA upgrade or update data have been transmitted by the server. A power outage, power glitch or any other reset or reboot of a client device may cause lost of received upgrade data at a client device.

In a further embodiment, the present disclosure provides to record, in a client device, received OTA upgrade data packages and a current OTA upgrade status in a non-volatile storage, and wherein when the client device resumes the OTA upgrade after receipt of an OTA upgrade notification message from the server notifying the OTA upgrade to the client device.

In this manner, time and resources are saved by avoiding retransmitting of already transmitted data packets in an ongoing OTA upgrade, in particular in a fast OTA upgrade or update, wherein candidate upgrade clients receive data packets transmitted by the server, although the server effectively communicates in the OTA upgrade with another client device, for example in ZigBee fast OTA upgrade.

In a third aspect of the present disclosure a server device is provided, arranged for performing an over-the-air, OTA, upgrade in a network of communicatively interconnected client devices in accordance with the method of the first aspect of the present disclosure.

In a fourth aspect, the present disclosure provides a client device, arranged for performing an over-the-air, OTA, upgrade in a network of communicatively interconnected client devices in accordance with the method of the second aspect of the present disclosure.

In a fifth aspect of the present disclosure there is provided a computer readable computer program product, comprising computer program code instructions which, when run on a computer device, causes the computer device to perform the method of any of the first and second aspect of to present disclosure. The computer program product may take the form of a computer readable storage medium or non-transitory medium like a memory stick, data disc, and the like, and/or may be provided as a download signal in a network, for example.

In a seventh aspect of the present disclosure there is a provided an electric or electronic device, such as a lighting device, comprising a client device according to the fourth aspect of the present disclosure.

These and other aspects of the disclosure will be apparent from and elucidated with reference to the embodiments described hereinafter.

DETAILED DESCRIPTION

The present disclosure is detailed below with reference to a wireless ZigBee™ enabled network and ZigBee enabled devices. Those skilled in the art will appreciate that the present disclosure is not limited to ZigBee operated networks and devices, but is applicable to a wide variety of networks of communicatively interconnected node devices, either partly wired and/or partly wireless, and arranged for exchange of software upgrade or update data of supplementary or peripheral electric or electronic devices operatively connected to a node device in the network.

Non-limited examples of other applicable transmission protocols are Bluetooth™, Thread™, as well as WiFi based protocols and transmission protocols in accordance with a 3GPP standard, and wired bus networks such as DALI™ (Digital Addressable Lighting Interface), DSI (Digital Serial Interface), DMX (Digital Multiplex), and KNX (based systems), wired Ethernet, etc.

Figure 1:
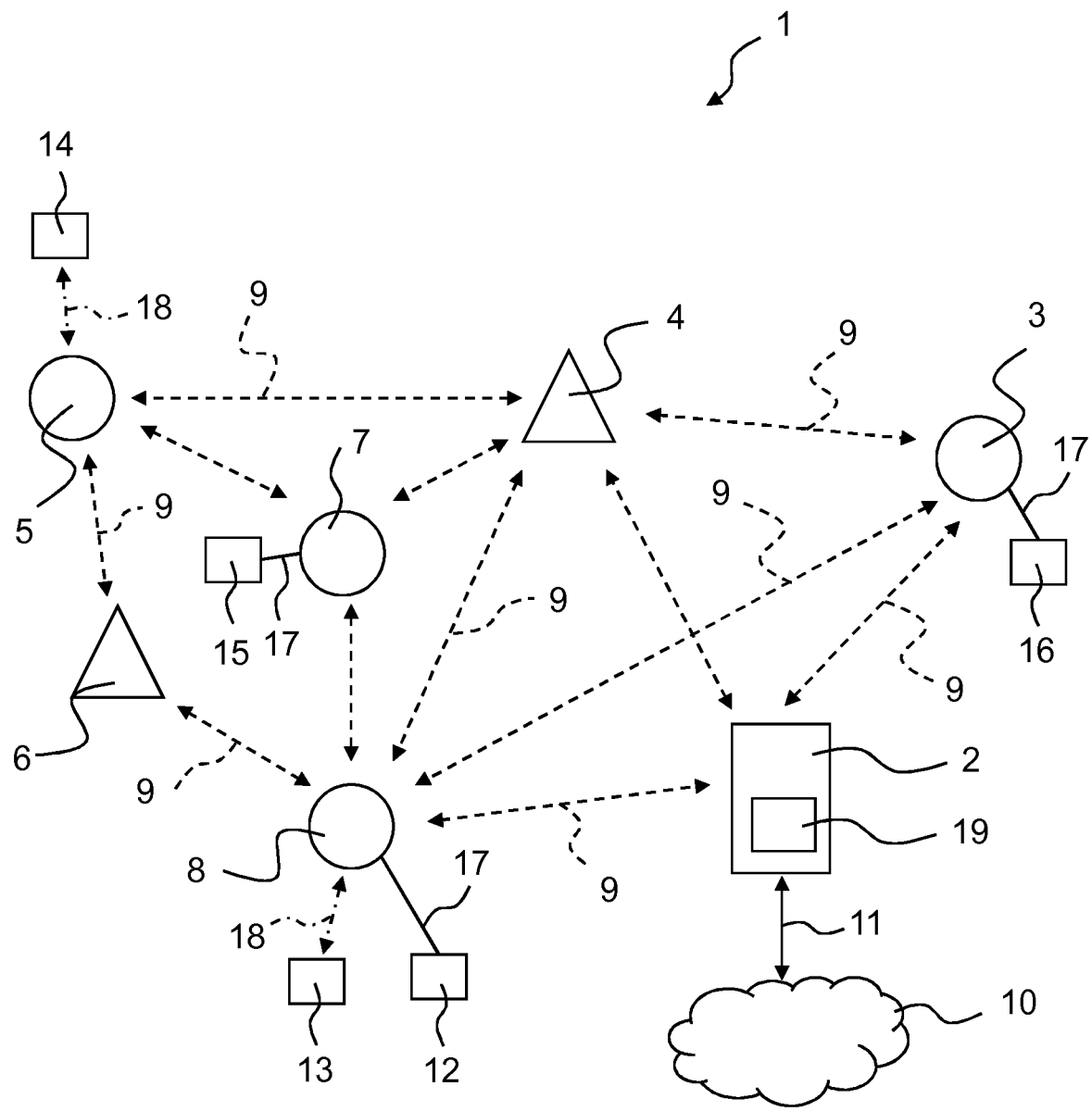
FIG. 1 illustrates, schematically, a network of communicatively interconnected network node devices and a gateway device arranged for operating as an over-the-air, OTA, server.

FIG. 1 illustrates, schematically, a network 1 of communicatively interconnected network node devices or client devices or in short nodes or clients 3, 4, 5, 6, 7, 8 and a gateway device 2 comprising a server or processor 19 for upgrade or update of software data of client devices. The network 1 is configured as a so-called Wireless Mesh Network, WMN, also commonly called Wireless Personal Area Network, WPAN, in accordance with the ZigBee protocol.

The network 1 is comprised of multiple network end nodes or clients 3, 5, 8 and network relay nodes or clients 4, 6 such as bridges and switches, for example. The nodes or clients 3-8 may form part of electric or electronic networked devices. The wireless communication connections between the network devices 2-8 are indicated by dashed arrows 9. Those skilled in the art will appreciate that in a general network architecture, part of the node or client devices may also connect by wired communication links (not shown).

The network end nodes or clients 3, 5, 8 are generic for supporting data communication of a large variety of electric or electronic devices, either mobile or movable devices and/or non-mobile or stationary devices. Examples of such devices are lighting devices, in particular smart lighting devices comprising Light Emitting Diode, LED, lighting modules, smart equipment for mobile telephony and data communication, Customer Premises Equipment, CPE, and so-called Internet of Things, IoT, devices.

Reference numerals 12-16 designate devices or systems, such as sensors for measuring humidity, temperature, Infra Red, IR, radiation, Carbon Monoxide, Carbon Dioxide, generally designated CON, actuators, camera systems, alarm systems, and other smart equipment running software applications. In the embodiment shown, the devices 12, 15 and 16 connect by a wired connection 17 to a respective node or client device, whereas the devices 13 and 14 connect by a wireless connection 18 to a respective node or client device, indicated by dash-dot lines. It will be appreciated that the devices 12-16 may be external of or internal, i.e. integrated in a network node or client device. In the present embodiment, data exchange over the connections 17 and 18 is also in accordance with the ZigBee protocol.

Network relay nodes or clients 4, 6 may bridge a communication distance between neighbouring network end nodes or clients 3, 5 or 5, 8 if such end nodes or clients 3, 5, 8 are not capable of establishing a direct communication connection between these end nodes. It is noted that network relay nodes or clients 4, 6 besides extending the network range, may also support supplementary data communication of a same variety of electric or electronic devices as mentioned above in connection with the end nodes or clients 3, 5, 8. Further, an end node or client and a relay node or client may be comprised in a single physical device. A node or client device may be mains or battery operated, for example.

The gateway device 2 operates as a network control or coordinator device, which may provide access 11 to other networks, such as the Internet 10, for example. Such a network control or coordinator device is also called a network access device. The gateway device 2 may be deployed in the network 1 or remote of the network 1. For communication purposes, the gateway 2 may comprise integrated transceiver equipment, that may directly connect to a data processing part of the gateway 2, for example by a universal serial bus, USB, port or the like, and comprises communication functionality for exchanging data packets or messages with the network nodes or clients in the network 1 using a same protocol as the network node or client devices 3-8, i.e. in the present example the ZigBee communication protocol.

Smart electric or electronic devices, such as smart lighting devices in a ZigBee network, for example, usually have embedded software inside and often need to upgrade or update their software for several times during their whole life cycle. When these devices are installed in end users' sites, the most convenient way to upgrade or update them is to perform over-the-air, OTA, data upgrade or update via the node or client devices 3-8 in the network 1. To this end, in the embodiment shown, the gateway device 2 comprises an OTA server or processor 19 for upgrade or update of software data of client devices. Those skilled in the art will appreciate that the OTA server 19 may also reside external of the gateway device 2, for example in the Internet or data 'Cloud' 10, or may operate as a separate OTA server node or OTA server gateway device in the network 1.

The network node or client devices 3-8 may communicate 9 directly with the gateway device 2 or, as described above, messages or data packets may be relayed to the gateway device 2 via neighbouring network relay nodes or clients 4 in the mesh network 1. The network node or client devices 3-8 are further configured for exchanging data messages or data packets with one or a plurality of the node or client devices in their neighbourhood.

Messages that are generated in a network node or client 3-8, and forwarded to the gateway 2 are generally referred to as uplink messages or uplink traffic. Messages that are forwarded from the gateway 2 to a network node or client 3-8 are referred to as downlink messages or downlink traffic. When not explicitly mentioned, the node or client devices 3-8 and the gateway device 2 are arranged for communicating messages or data packets in the network 1 of the present disclosure in either one or both of a unicast and broadcast transmission mode.

Figure 2:
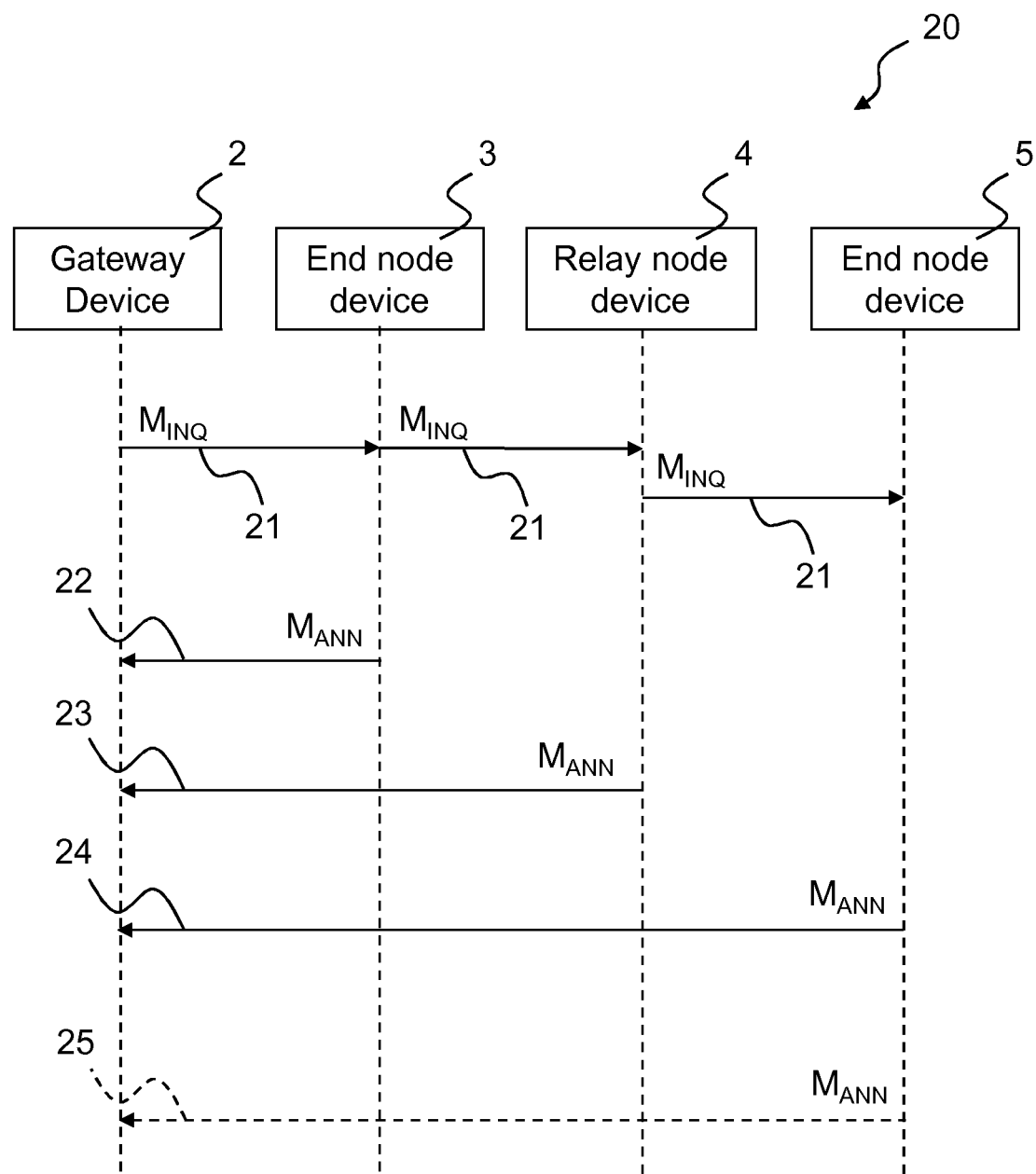
FIG. 2 illustrates, in a sequence diagram, an example of a method of requesting and reporting node device address announce messages in a network of communicatively interconnected network node devices.

FIG. 2 illustrates, in a sequence diagram 20, an example of a method of inquiring a node or client device address announce message by a gateway device at commissioning of the network in accordance with the ZigBee specification, issued by the ZigBee Standards Organization, which ZigBee specification is herein fully incorporated by reference.

For clarity reasons, only three node devices 3, 4, 5 are shown in the sequence diagram.

In FIG. 2, time is running from the top to the bottom of the sheet (not shown). In this example, after commissioning of the network 1, that is after installation and testing of the node devices and the gateway equipment and communication facilities of the network according to design objectives or specifications, the gateway device 2 broadcasts an inquiry message, $M_{INQ}$, or inquiry data packet 21 in the network 1. The inquiry message 21 is directly received by the end node or client device 3 and the relay node or client device 4, and is indirectly received by the end node or client device 5 through the network relay node or client device 4, for example. This inquiry message 21 may be broadcasted after a certain time interval after starting or ending commissioning of the network. For example, the inquiry message 21 may be broadcasted after a time interval of 15 minutes after ending commissioning of the network 1.

Receipt of the inquiry message 21 commands or causes the node or client devices in the network to announce their address information. The gateway device 2 may need to know any or both of the specific network address and/or Media Access Control, MAC, address or IEEE address of all node devices in the network in order to correctly control and communicate with these node devices.

Each node or client device transmits, i.e. in a broadcast or unicast transmission mode, its node device address announce message, $M_{ANN}$, or address announce data packet 22, 23, 24 in the network 1 for receipt by the gateway device 2. The node device address announce messages 22, 23, 24 comprise network address information of the respective node or client device in the network 1 for communication and control purposes, such a specific or short network address in ZigBee and/or the MAC address allocated to the respective node device.

In a ZigBee enabled network, for example, when a node or client after commissioning changes its network address, such as for example the node or client device 5, this node or client transmits its new or current network address in a node device announce packet or message, such as illustrated in dotted lines by reference numeral 25.

The thus gathered network address information by the gateway device 2 is made available to the OTA servers 19.

Generally, in case of an OTA upgrade, the network devices that require upgrade or update are called client devices. In the present description and the claims, the term node device or in short node and client device or in short client are generic for all the devices connected in a WMN, a WPAN, or any network of communicatively interconnected communication devices.

Figure 3:
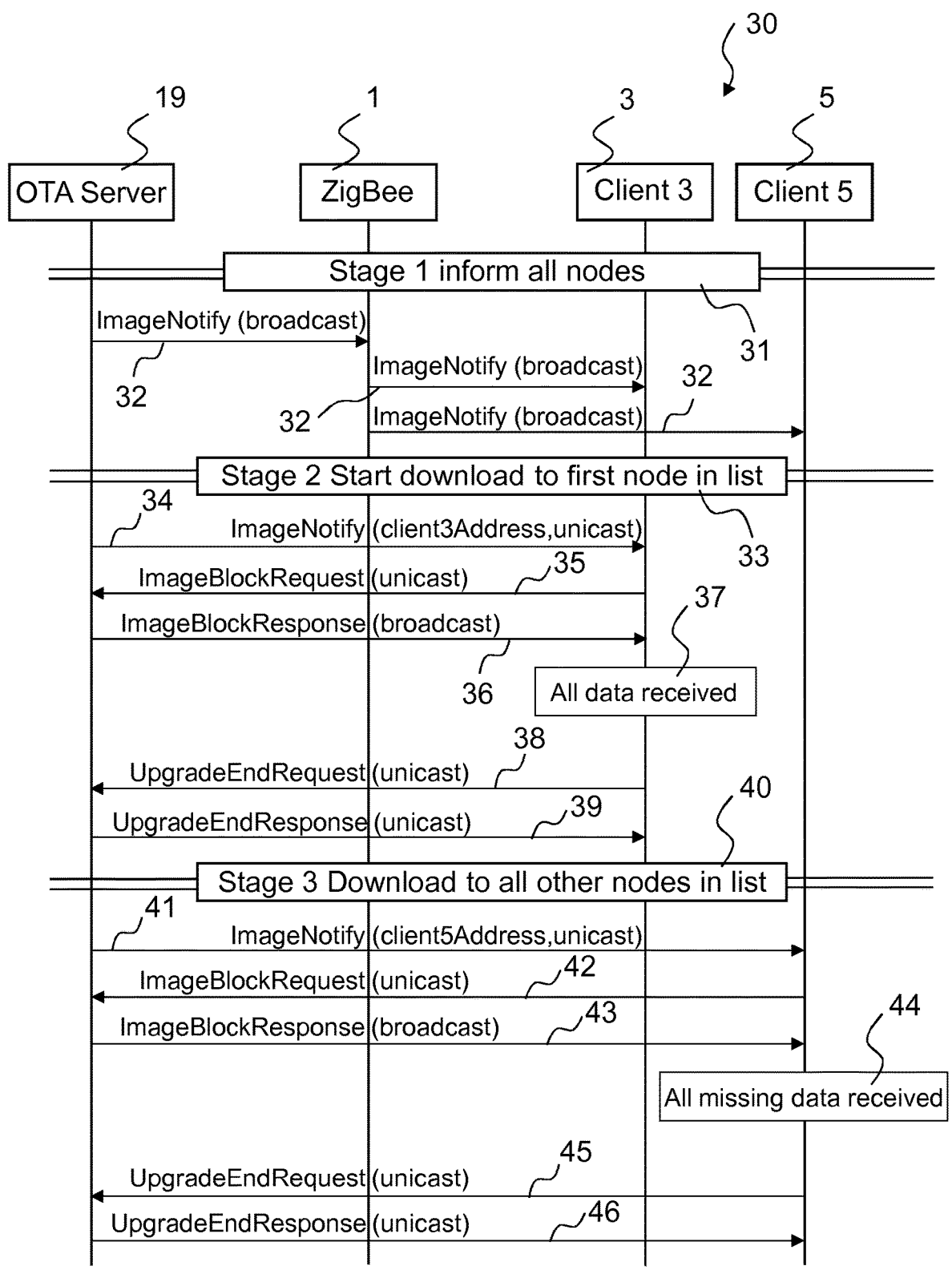
FIG. 3 illustrates, in a sequence diagram, an example of a fast OTA procedure in accordance with the ZigBee specification.

FIG. 3 illustrates, in a sequence diagram 30, an example of a so-called fast OTA upgrade in accordance with the ZigBee protocol. For clarity reasons, only two node devices 3 and 5 are shown, while time is running from the top to the bottom of the sheet (not shown).

Generally, prior to the start of an OTA, the OTA server 19 builds an OTA list. The OTA list comprises the network addresses of all candidate OTA clients that may require upgrade or update. Assume that software in the nodes or clients 3 and 5, or any of the devices 14 and/or 16 connected to the node devices 5, 3, respectively, is to be upgraded or updated. The network 1 as such is indicated by a separate box in the sequence diagram 30.

In a first stage of the OTA upgrade, all candidate clients in the network are informed of the upgrade in that the server 19, if applicable through the gateway device 2, broadcasts a notification message 32 ImageNotify(broadcast) in the network 1, to notify all candidate OTA clients that an OTA is going to start, reference numeral 31 Stage 1 inform all nodes.

Transmission of data packets or data blocks by the OTA starts in stage 2 of the OTA upgrade, reference numeral 33 Stage 2 Start download to first node in list, in that the OTA server 19 selects a first OTA client in the list of candidates, say OTA client 3, by transmitting in unicast mode a notification message based on the network address of this OTA client, reference numeral 34 ImageNotify(client3Address, unicast).

After receiving the notification message 34, the addressed OTA client 3 requests by a unicast message data from the OTA server 19, reference numeral 35 ImageBlockRequest (unicast) and the OTA server 19 replies the request in broadcast mode with data blocks or data packages compris-ing the upgrade or update information, reference numeral 36 Image BlockResponse(broadcast). The OTA data blocks or packages are exchanged in a broadcast mode of operation, such that all other OTA clients can receive them too.

Once the OTA client 3 has received all the upgrade or update data, block 37 All data received, the OTA client 3 transmits in unicast mode a message 38 UpgradeEndRequest (unicast), informing the OTA server 19 that the OTA client 3 has received all data of the upgrade file. The OTA server 19 acknowledges completion of the upgrade to this OTA client 3 in unicast mode by a completion message 39 UpgradeEndResponse(unicast).

Next, in stage 3 of the OTA upgrade, reference numeral 40 Stage 3 download to al other nodes in the list, other clients in the upgrade candidate list are selected by the OTA server 19 to check the completion of the upgrade for these nodes or clients. In the present example, the OTA server 19 transmits in unicast mode a respective notification message 41 to OTA client 5 ImageNotify(client5Address, unicast). Because OTA client 5 may have received already many data blocks or data packets from the previous broadcast of the upgrade data or update data by the OTA server 19 to the OTA client 3, the OTA client 5 now only may request possible missing data blocks or data packets from the OTA server 19.

If data blocks are missing, the OTA client 5, in response to the notification message 41 transmits in unicast mode to the server 19 a respective data request message 42 Image-BlockRequest(unicast) and the OTA server 19 replies the request in broadcast mode with data blocks or data packages comprising the missing upgrade or update information, reference numeral 43 Image BlockResponse (broadcast). The missing OTA data blocks or packages are exchanged in a broadcast mode of operation, such that all other OTA clients can receive them too.

During the OTA upgrade, the OTA client 5 and the OTA server 19 may exchange several data request and data response messages 42, 43.

If the OTA client 5 has received al missing upgrade data packets or data blocks, reference numeral 44 All missing data received, the upgrade for this OTA client 5 is ended by the exchange of message 45 UpgradeEndRequest(unicast), from the OTA client 5 to the OTA server 19 and OTA completion message 46 UpgradeEndResponse(unicast), from the OTA server 19 to the OTA client 5. Both messages are exchanged in unicast transmission mode.

If OTA client 5 has no missing data blocks, it will immediately transmit the UpgradeEndRequest(unicast) message 45 in response to the notification message 41, informing the OTA server 19 that the OTA client 5 has received all data of the upgrade file, and the upgrade to this OTA client may be completed by the OTA server 19 in responding with an UpgradeEndResponse(unicast) message 46.

The OTA server 19 repeats the transmission of a notification message addressed to all other candidate OTA clients from the upgrade list, one after the other, till the OTA server has received completion messages from all OTA clients informing the OTA server that all OTA clients have received the upgrade file, and the upgrade to all the OTA clients may be completed.

As mentioned above, during an ongoing upgrade, that is started with the building of the list of candidate OTA clients by the OTA server, an OTA client's network address, such as the ZigBee short address, may get changed. Such a network address change may be caused, for example, if there is any address conflict between two node devices in a large network, for example when a new device is added to the network.

After the client's network address changes, the client may broadcast its new or current network address in the network, such as with a device announce packet or message, as mentioned above in respect of the commissioning of the network and its devices. However, in particular in large scale networks, the OTA server may not receive the message. Whether the new address is broadcasted by a device may dependent on the communication protocol used. In practice, the OTA server may be left unknown of the new network address during an ongoing OTA upgrade.

Figure 4:
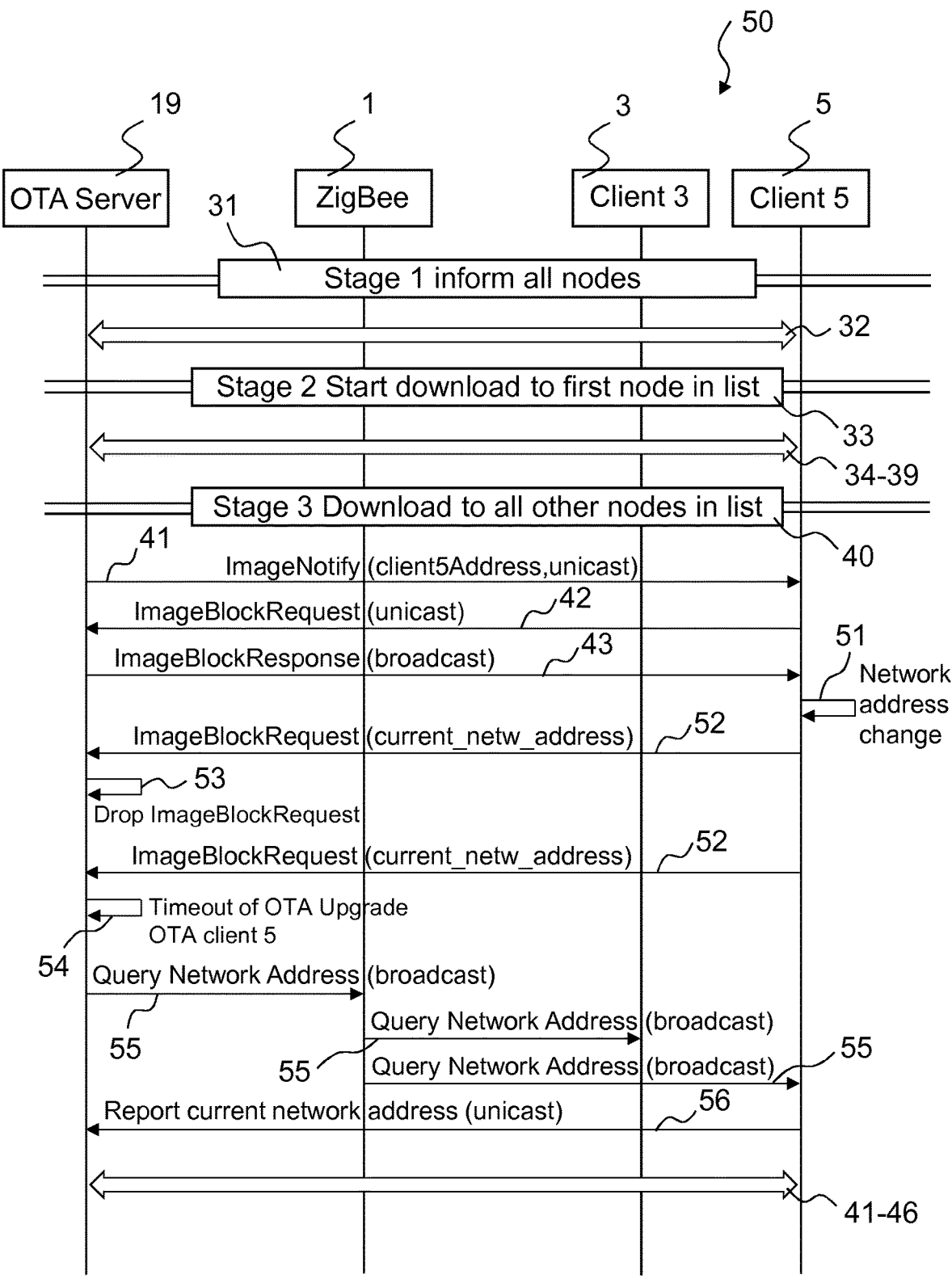
FIG. 4 illustrates, in a sequence diagram, an example of a fast OTA procedure in accordance with the present disclosure.

FIG. 4 illustrates in a sequence diagram 50 an example wherein OTA client 5 exhibits a network address change in stage 3 of the OTA upgrade or update process, and the OTA server 19 is not informed of this network address change. The steps in stages 1 and 2 of the OTA upgrade are identical to steps as disclosed above with reference to FIG. 4, and are for convenience sake indicated by single double arrows 32 and 34-39, respectively.

In this example, it is assumed that the network address change of OTA client 5 occurs after the OTA server 19, in stage 3 of the OTA upgrade process, has already replied to an ImageBlockRequest(unicast) 42 of OTA client 5 by the transmission of OTA upgrade data in a Image BlockResponse(broadcast) 43.

As a consequence of the network address change, the OTA client 5 may request anew for upgrade data with the OTA server 19, by transmitting to the OTA server 19, in unicast mode, an ImageBlockRequest(current-netw-address) 52, based on the current. i.e. the new network address of the OTA client 5.

As the network address in the data request message 52 does not match the network address of the OTA upgrade notification message 41 previously transmitted by the OTA server 19, the OTA server 19 will not recognize data request message 52 as a request in the ongoing OTA upgrade with OTA client 5, and will drop this data request, as indicated by reference numeral 53, DropImageBlockRequest.

The OTA client 5 may, after lapse of a time interval, repeat ones or several times the ImageBlockRequest(current-netw-address) 52.

As the OTA server 19 will drop any message received with the current network address of the OTA client 5 in the ongoing OTA upgrade, eventually the OTA server 19 will assume not to receive a response from the OTA client 5, such that a timeout at the OTA server 19 occurs, as indicated by reference numeral 54 Timeout of OTA Upgrade OTA client 5, and the OTA upgrade process fails, because the OTA server 19 and the OTA client 5 are not able to communicate with each other anymore.

In accordance with the present disclosure, in case of a timeout, the OTA server 19 checks the network or short address change with the OTA client 5 in a reliable way by transmitting, for example in a broadcast mode of operation, a network address querying message 55 Query Network Address (broadcast) in the network 1. The broadcasting can be repeated for several times, to make sure that the OTA client 5 will receive it. The network address querying message 55 may be based or comprise the Media Access Control, MAC, address or IEEE address of node or client device 5, or any other identifier uniquely identifying the OTA client 5 in the network 1.

Once the network address querying message 55 is received by the OTA client 5, the OTA client replies this message by reporting its current or new network address to the OTA server in a network address reporting message 56 Report current network address (unicast), preferably transmitted in unicast mode. At receipt of the changed network address of OTA client 5 at the OTA server 19, the OTA upgrade process with OTA client 5 will be continued by transmitting, by the OTA server 19, a respective notification message 41 ImageNotify(client5Address, unicast). In this message client5Address is the new network address or short address of OTA client 5. The OTA upgrade then continues as described above with reference to FIG. 4, stage 3, and for convenience indicated in FIG. 4 with a double arrow 41-46.

Figure 5:
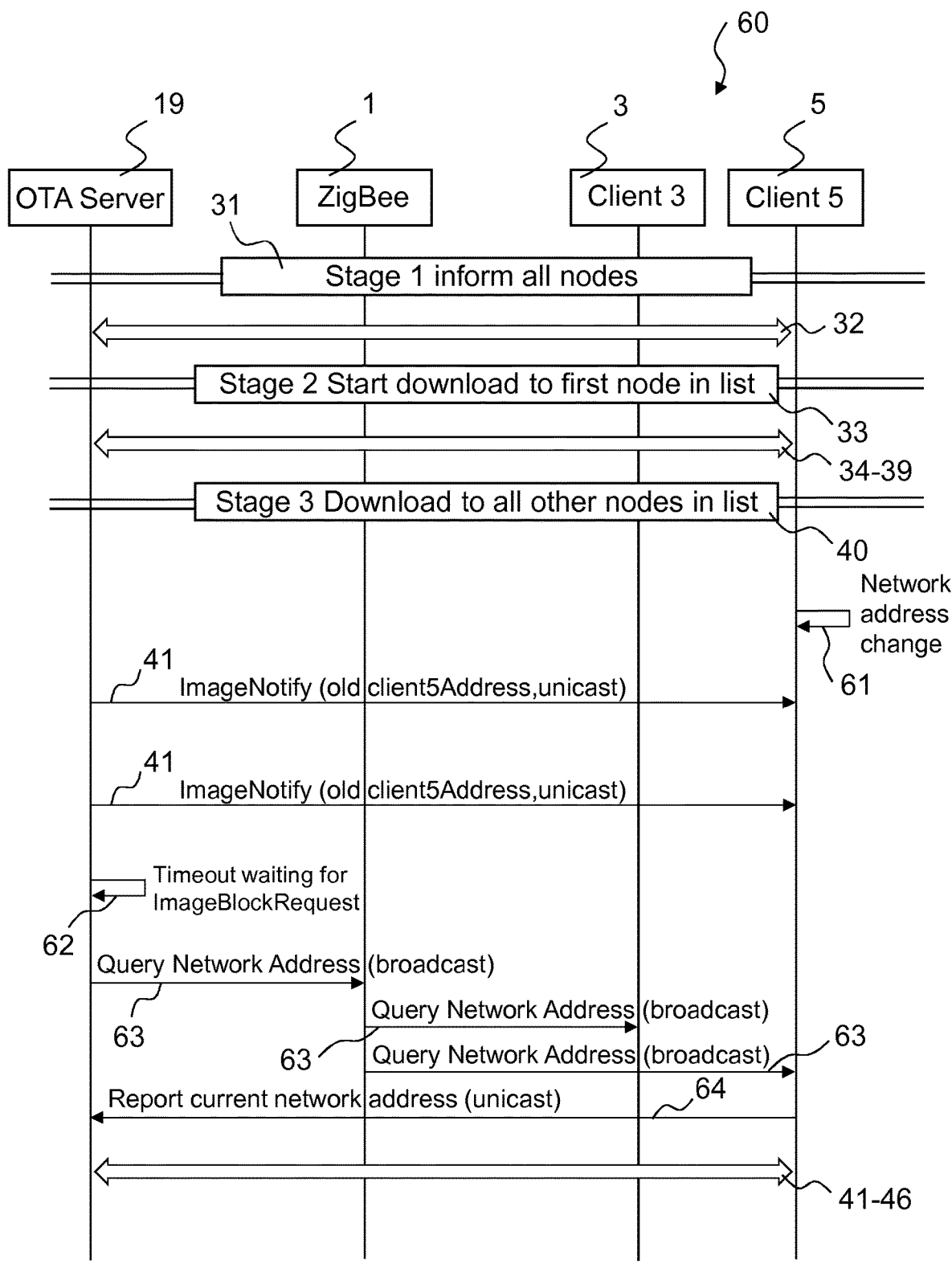
FIG. 5 illustrates, in a sequence diagram, an other example of a fast OTA procedure in accordance with the present disclosure.

The sequence diagram 60 in FIG. 5 illustrates an other example wherein the OTA server 19 may cause a timeout in case of a network address change of an OTA client device in an ongoing OTA upgrade process. Again, it is assumed that the OTA server will or has not been informed about a change of the network address of OTA client 5. In this example, the network address change at OTA client 5 occurs at the start of stage 3, prior to the transmission of a notification message to OTA client 5 to request possible missing upgrade data blocks or data packets from the OTA server 19, as indicated by reference numeral 61 Network address change.

The OTA server transmits the notification message 41 in unicast mode based on the old or previous network address of OTA client 5 ImageNotify(old client5Address, unicast). The OTA client device 5 will not receive the OTA upgrade notification message 41 transmitted by the OTA server 19, because the network address of this message does not match the current or new network address of OTA client 5. Accordingly, the OTA client device 5 will not respond to the notification message by requesting the server to transmit the missing data of the OTA upgrade. The notification message 41 may be repeated a few times by the OTA server 19. As no request for upgrade data will be received by the OTA server 19, eventually a timeout 62 occurs at the server 19, Timeout waiting for ImageBlockRequest.

In accordance with the present disclosure, in case of a timeout, the OTA server 19 checks the network or short address change with the OTA client 5 by transmitting a network address querying message 63 Query Network Address (broadcast) in the network 1. The network address querying message 63 is based or comprises the Media Access Control, MAC, address or IEEE address of node or client device 5, or any other identifier uniquely identifying the OTA client 5 in the network 1.

Once the network address querying message 63 is received by the OTA client 5, the OTA client replies this message by reporting its current or new network address to the OTA server 19 in a network address reporting message 64 Report current network address (unicast), preferably transmitted in unicast mode. At receipt of the changed network address of OTA client 5 at the OTA server 19, the OTA upgrade process with OTA client 5 will be continued by transmitting, by the OTA server 19, a respective notification message 41 etcetera, as disclosed above with reference to FIGS. 3 and 4, and generally indicated in FIG. 5 with a double arrow 41-46.

Although not explicitly shown, those skilled in the art will appreciate that a timeout at the OTA server 19 may also occur when a change of network address occurs in an OTA client prior to the transmission of the UpgradeEndRequest (unicast) 45 by the OTA client. Further, a server timeout may also occur if an OTA client changes network address at stage 1 or during stage 2 of an ongoing OTA upgrade or update.

The network address querying message 55, 63 may be repeated by the OTA server until a set or settable maximum number of repeats is exceeded, for example. In that case, the OTA upgrade may be started anew or a network address inquiry process may be started as illustrated with reference to FIG. 2, for example.

Figure 6:
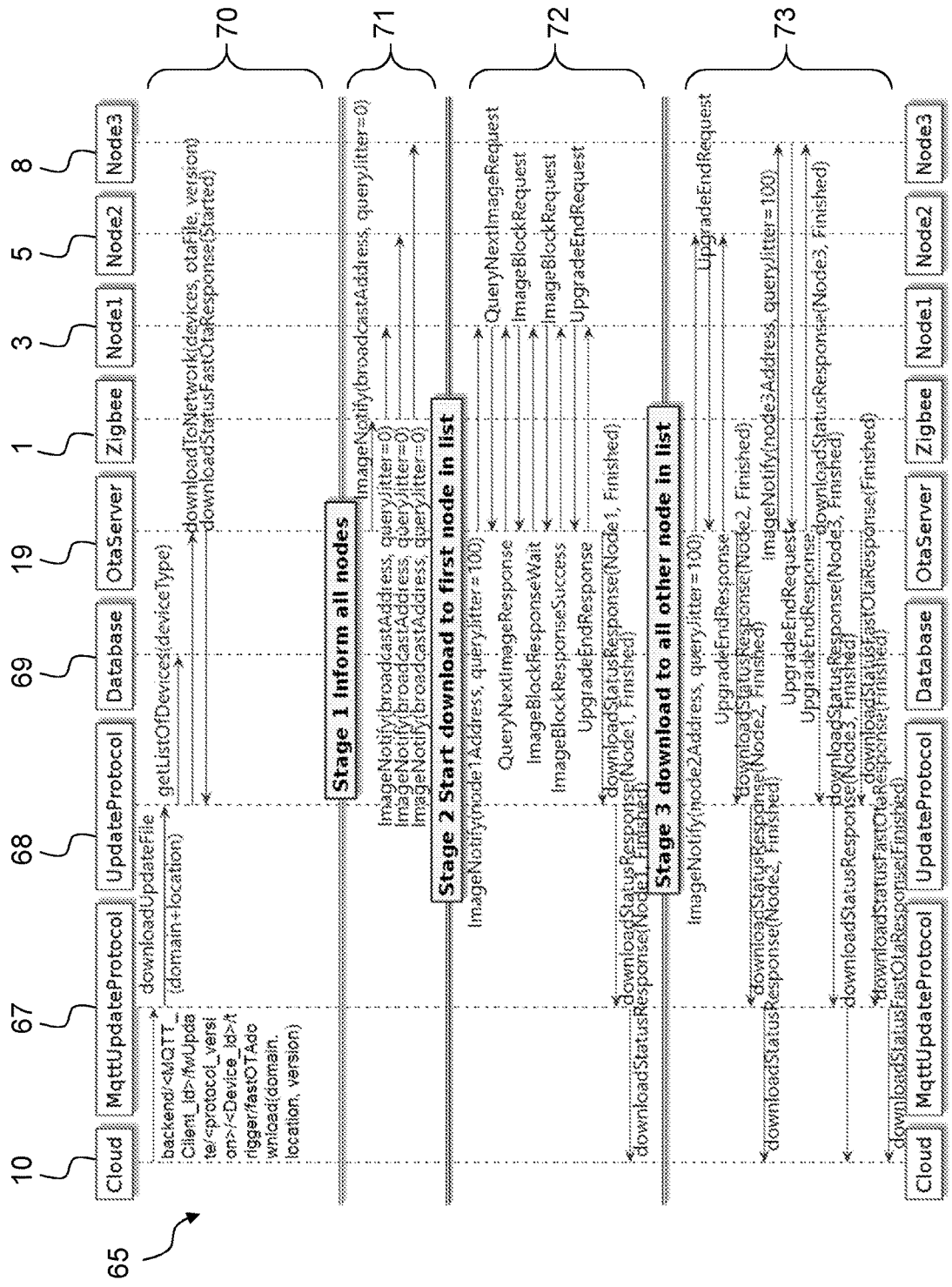
FIG. 6 illustrates, in a sequence diagram, a comprehensive example of a known fast OTA upgrade in a ZigBee enabled communication network from an external source.

FIG. 6 shows, for completeness sake, in a sequence diagram 65 a comprehensive example of a known fast OTA upgrade in a ZigBee enabled communication network 1, of an MQTT (Message Queuing Telemetry Transport) protocol 67 MqttUpdateProtocol available from an external source connected to the Internet or Cloud 10. MQTT is a machine-to-machine (M2M)/Internet of Things connectivity protocol and is used, for example, with sensors connected in ZigBee enabled communication environment. This protocol is also applicable with mobile applications because of its small size, low power usage, minimised data packets, and efficient distribution of information to one or many receivers. Reference is also made to FIG. 1.

In a first step, collectively identified by reference numeral 70, the update or upgrade file is downloaded from a backend device in the cloud 10, indicated by reference numeral 68 UpdateProtocol. As already disclosed above, a list of candidate node devices or client devices to be updated is retrieved from a database 69, for example available in the gateway 2 or OTA server 19. The OTA upgrade is performed under control of the OTA server 19.

In the first stage, i.e. stage 1, of the OTA upgrade, all nodes or clients to be updated, i.e. 3, 5, 8 or node1, node2, node3, respectively, are informed of the commencement of the OTA upgrade, collectively identified by reference numeral 71.

Next, in stage 2, for the first node or client in the candidate upgrade list, upgrade data packets or data blocks are broadcasted by the OTA server 19, till the upgrade of this node or client 3 is completed. Upgrade status information is exchanged between the OTA server 19 and the cloud based update source 10. The steps of notifying, querying for and providing upgrade data are collectively referred to by reference numeral 72.

At stage 3 all the other nodes or clients 5, 8 are one after the other checked for update, as collectively indicated by reference numeral 74, and in this stage also upgrade status information is exchanged.

Figure 7:
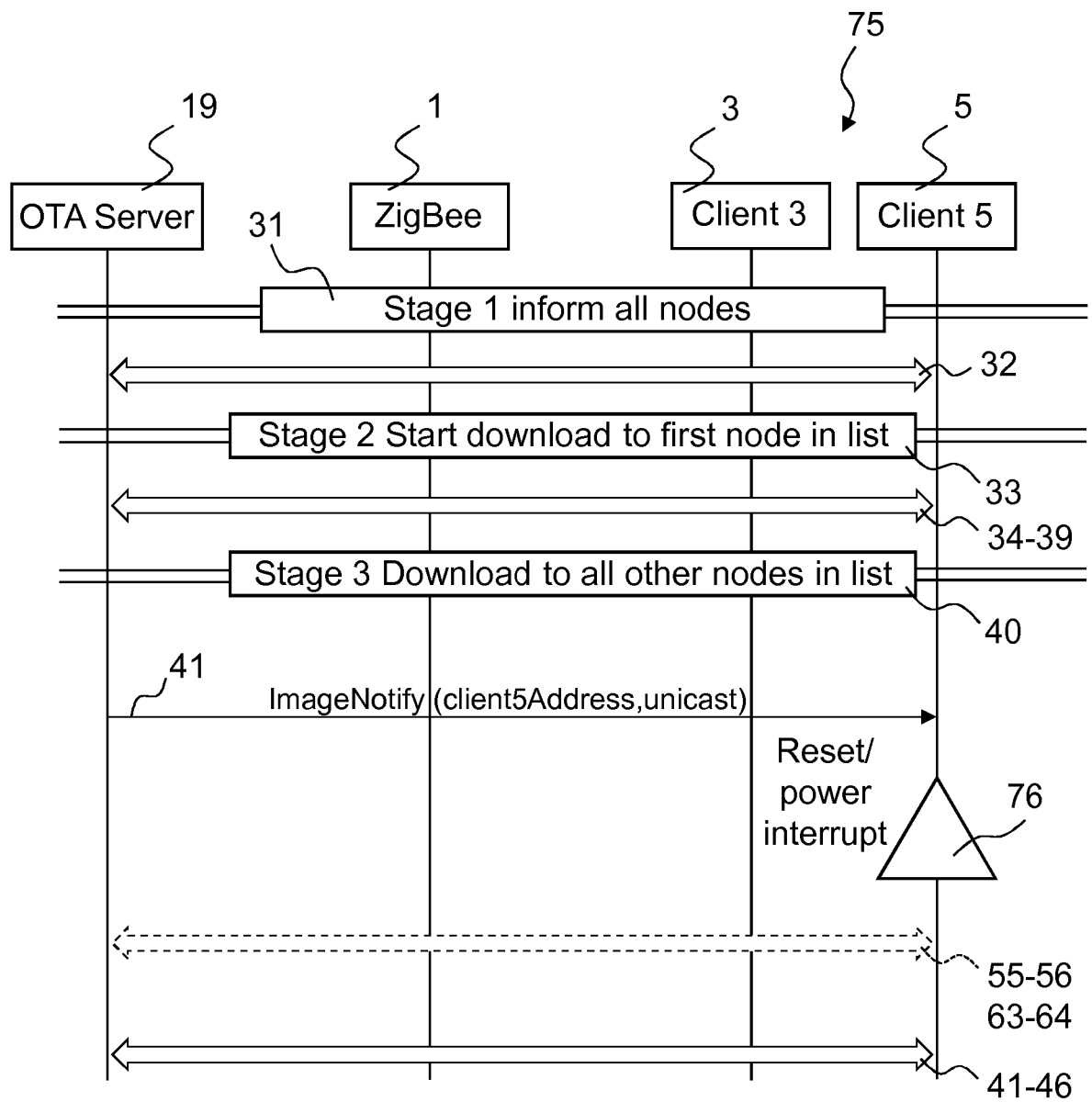
FIG. 7 illustrates, in a sequence diagram, the occurrence of a reset or power outage of a node device in an ongoing fast OTA procedure in accordance with the present disclosure.

The sequence diagram 75 in FIG. 7 illustrates an example of a reset or power interruption 76 Reset/power interrupt of client 5 at stage 3 of the OTA upgrade. As described above, in stage 2 of the OTA upgrade, the client 5 has already received data packets or data blocks broadcasted by the OTA server 19 during the upgrade or update of client 3. In stage 3 of the fast OTA upgrade, only data packets that client 3 is missing are broadcasted by the OTA server 19.

However, if the reset or power interruption 76 has the consequence that the upgrade data packets already gathered by client 5 are lost, the whole fast OTA upgrade will be delayed, as this OTA client will perform an OTA upgrade from the start, inclusive the exchange of the data packets already broadcasted at stage 2 of the IOTA process.

Eventually, an OTA upgrade failure may also arise from a client or node reset or power outage during an ongoing OTA upgrade, for example if the OTA server 19 does not receive a response from the (disabled) client 5 after transmission of the notification that the OTA server 19 is available for upgrade of node 5 by a ImageNotify (client5Address, unicast) message 41, and eventually times out. See also FIG. 4.

Those skilled in the art will appreciate that a timeout of the OTA server 19 disclosed above in connection with FIG. 5 is also applicable in case of reset or power outage for a longer time. In that case, in accordance with the present disclosure, the OTA server 19 may quickly resume the OTA update or update through a network address querying message from the OTA server 19 and a network address reporting message from the client 5, as the network address of the client 5 is generally not changed. Even if the network address of the client 5 would have been changed due to a device reset, the OTA upgrade may continue with the solution according to the present disclosure, as disclosed by the double arrow labelled 55-56, 63-64 in FIG. 7, and continue with the download of missing packets, as indicated by the double arrow 41-46.

To avoid loss of already stored data packets at a node device or client, it is proposed to make sure that the client or node during fast OTA will persistently record the data packages or image received and OTA status or stage information. If any reset or power outage happens, the node or client may resume to continue the fast OTA process, i.e. steps 41-46, without any data loss. This will significantly reduce the total upgrade time of the whole network.

Persistent data storage support may be achieved by a non-volatile memory or storage, such as Serial Peripheral Interface, SPI, flash memory or other external flash accessible to the OTA client device. OTA status or stage information is kept in an OTA state machine of the OTA client device.

Figure 8:
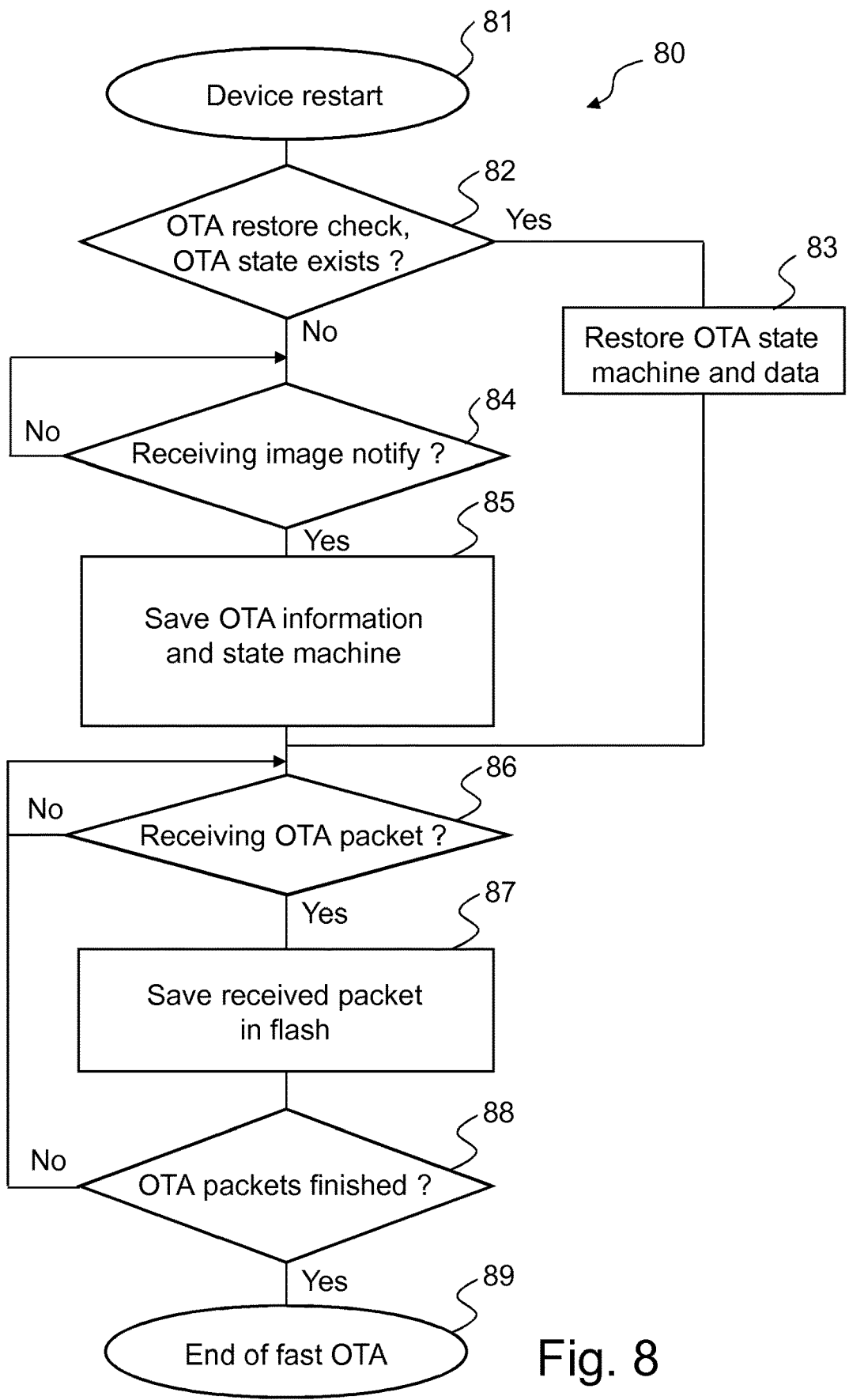
FIG. 8 illustrates, in a flowchart diagram, an algorithm for restoring an interrupted OTA upgrade in case of a node device reset or power outage.

FIG. 8 shows, in a flow chart type diagram 80, an algorithm for resuming OTA upgrade after a client or node device resets or restarts in the case of a non-volatile storage of received data packets and OTA status information at the node or client device. In the flow chart 80, the normal flow of operation runs from the top to the bottom of the sheet. In all other cases, an arrow indicates the flow direction.

After a device or OTA client restart, block 81 'Device restart', an OTA restore and OTA state check is performed by the OTA client. That is, the fast OTA stage or status in which the OTA client existed prior to the reset or restart is checked, decision block 82 'OTA restore check, OTA state exists? If their exists an OTA state of the OTA client, that is the OTA client was involved in an ongoing OTA upgrade, i.e. decision block 81 result 'Yes', the OTA client state machine and the already received data packets of the ongoing OTA upgrade should be restored, i.e. block 83 'restore OTA state machine and data'. The OTA upgrade is resumed by checking whether OTA upgrade data packets are received, i.e. decision block 86 'Receiving OTA packet?'.

If no OTA state exists, i.e. decision block 81 result 'No', the OTA upgrade process is resumed at the OTA client by checking for the receipt of a notification message of the OTA server 19 to start requesting OTA upgrade data packets by the OTA client, i.e. decision block 84 'Receiving image notify?'. If negative, i.e. decision block 84 result 'No', the client device keeps checking. In the affirmative, i.e. decision block 84 result 'Yes', the client OTA information and state machine is saved, i.e. block 85 'Save OTA information and state machine', and OTA upgrade data packets are received by the OTA client and stored, i.e. decision block 86 result 'Yes' and block 87 'Save received packet in flash'. That is, in this embodiment, the received OTA upgrade data are stored in flash memory and the index as well is recorded.

If no OTA data packet is received, i.e. decision block 86 result 'No', the client device keeps in a mode for receiving OTA upgrade or update data packets, and also as long as not all OTA data are received, i.e. decision block 88 'OTA packets finished?', result 'No'.

If OTA packets are complete, i.e. decision block 88 result 'Yes', the OTA procedure is stopped, as illustrated in FIGS. 4 and 6, for example, i.e. block 89 'End of fast OTA'.

Accordingly, with the above reset-restore algorithm, during the OTA state, if the node is reset or power down/on, the OTA process will continue and does not need to receive all the upgrade packets from the beginning. This significantly reduces the total time to upgrade all the nodes or clients in the network also if any power cut event occurs at one or more of the client devices selected for update or upgrade.

Figure 9:
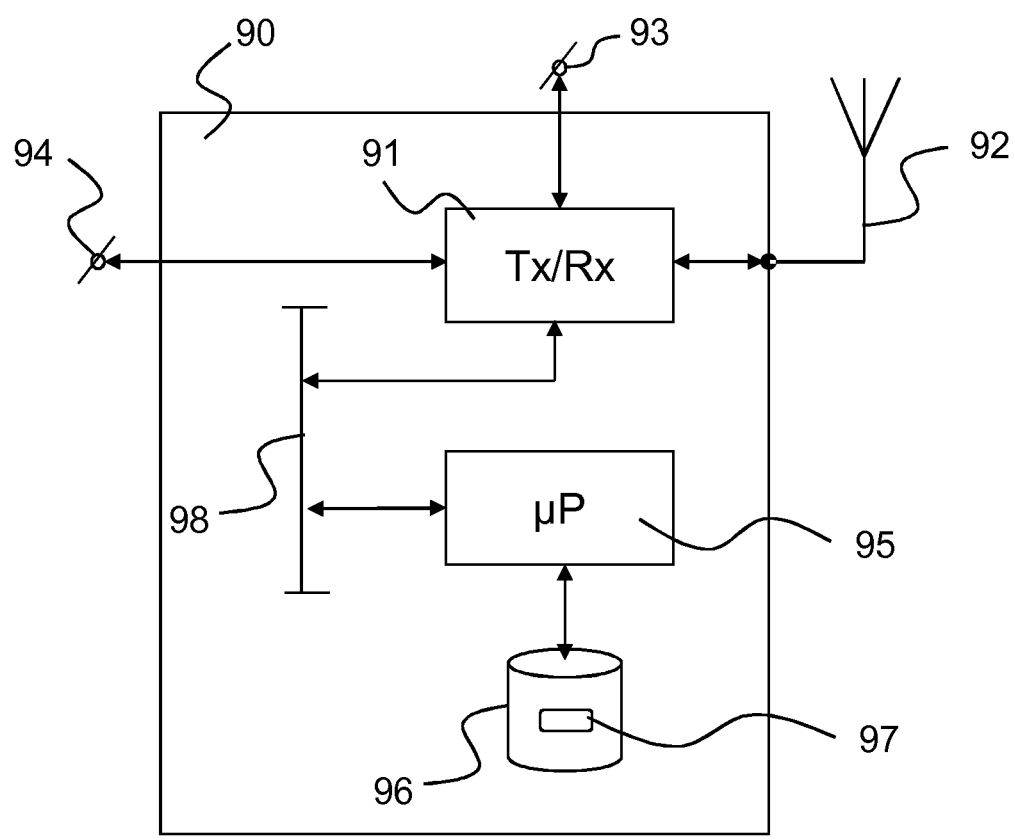
FIG. 9 illustrates, schematically, a circuit diagram of an embodiment of an OTA server device in accordance with the present disclosure.

FIG. 9 illustrates, schematically, a circuit diagram of an embodiment of a server device 90 arranged for performing OTA upgrade or update of client devices in a mesh network or the like, in accordance with the present disclosure. The server 90 comprises a transceiver, Tx/Rx, module 91 arranged for wireless 92, i.e. over-the-air, exchange of messages or data packets in the network. The transceiver 91 is further arranged for wired data exchange with an external device, such as a backend server in the Internet or cloud 10 (FIG. 1), through an input/output data terminal 94. The transceiver 91 may be configured to operate in accordance with any of the data communication technologies and protocols mentioned above with reference to FIG. 1, in one or both of a broadcast and unicast mode of operation and, if applicable, for data exchange with external sources in other networks, such as the Internet, for example.

The server device 90 further comprises at least one data processor or controller 95, and at least one data repository or storage or memory 96, among others for storing computer program code instructions which, when loaded and run on to the one or more processor or controller 95, configure the server device to operate in accordance with the method of the present disclosure.

Upgrade data for the clients in the network may be stored in the repository 96, or a separate memory or storage accessible to the at least one processor or controller 95. The at least one processor or controller 95 communicatively interacts with and controls the transceiver 91 and the at least one repository or storage 96 via an internal data communication bus 98 of the server device 90.

Although not explicitly shown in FIG. 9, a dongle may connect to the bus 98 for performing address inquiry processing in accordance with the present disclosure. In practice, the server 90 may form part of a gateway device 2, as shown in FIG. 1.

Figure 10:
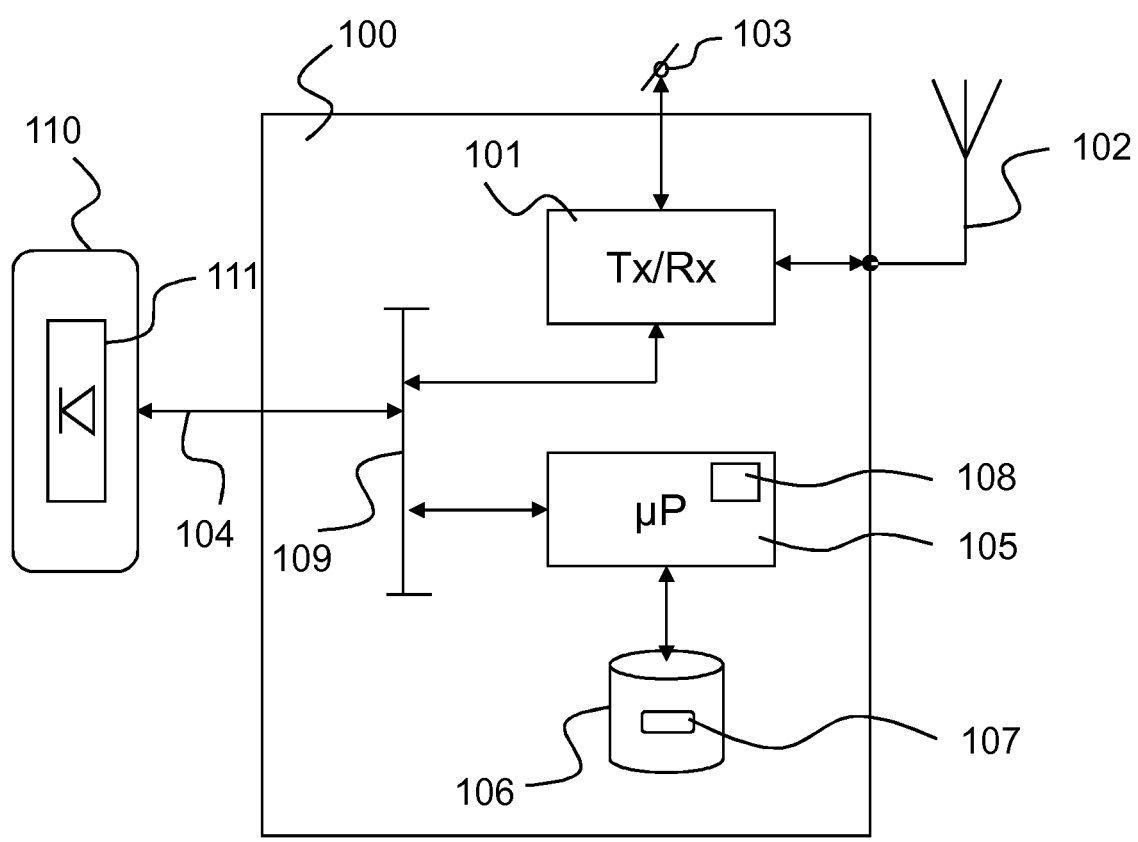
FIG. 10 illustrates, schematically, a circuit diagram of an embodiment of a node device in accordance with the present disclosure.

FIG. 10 illustrates, schematically, a circuit diagram of an embodiment of a node or client device in accordance with the present disclosure. The node device 100 comprises a transceiver, Tx/Rx, module 101 arranged for a wireless 102 and/or wired 103 exchange of messages or data packets with a gateway and/or over-the-air upgrade server, and other node devices, inclusive relay node devices, in a network of communicatively interconnected network node devices. The transceiver 101 may be configured to operate in accordance with any of the data communication technologies and protocols mentioned above with reference to FIG. 1, in one or both of a broadcast and unicast mode of operation.

The node device 100 further comprises at least one data processor or controller 105, and at least one data repository or storage or memory 106, among others for storing computer program code instructions which, when loaded and run on to the one or more processor or controller 105, configure the node device 100 to operate in accordance with the present disclosure. Address information 107 of the node device in a network, inclusive its MAC address, may be stored in the repository 106, or a separate memory or storage accessible to the at least one processor or controller 105.

The repository or storage 106 further may be arranged as a persistent or programmable erasable storage for storing upgrade data packets and state information of an ongoing OTA process. To this end the data repository or storage 106 may be arranged as a non-volatile memory or storage, such as Serial Peripheral Interface, SPI, flash memory or other external flash accessible to the OTA client device. OTA status or stage information may also be kept in an OTA state machine 108 residing in the processor or controller 105 of the OTA client device 100, for example.

The at least one processor or controller 105 communicatively interacts with and controls the transceiver 101 and the at least one repository or storage 106 via an internal data communication bus 109 of the node or client device 100.

The node or client device 100 may be part of or operatively connect 104 to an electric or electronic device, such as lighting device 110, comprising a lighting module 111, preferably a LED lighting module, operation of which may be controlled by the node device 100 from or through a network gateway, or by a remote control device, for example. As mentioned above, instead of or in addition to a lighting device, a node device may control several other electric or electronic devices, operatively connected in a network in accordance with the present disclosure.

The present disclosure proposes to let the OTA server check whether a network address change of a selected OTA client causes the OTA server to timeout waiting for a response or request message from an OTA client during an ongoing OTA data upgrade. Instead of dropping a request for transmitting OTA upgrade by the OTA server based on the changed network address of an OTA client, i.e. dropping 53 the ImageBlockRequest(current_netw_address) 43 in FIG. 4, it is possible to broadcast, by the OTA server, as a network address querying message, an ImageBlockResponse with a specific status value that informs the OTA client to report its current network address to the OTA server. The OTA server, when receiving a request from an unknown device, i.e. a device the network address of which is unknown to the OTA server, an ABORT status may be transmitted by the OTA server in response.

Alternatively, upon a network address change in a ZigBee enabled network, the OTA client selected by the OTA server for OTA upgrade may re-broadcast the device announce message Device_annce upon a failing request for transmitting OTA upgrade, i.e. an Image request, for a several times. The OTA client changing the address may also include for a while its IEEE address in the NWK header after an address change. According to the ZigBee specification, for example, upon receipt of a frame containing a 64-bit IEEE address, the contents of the nwkAddressMap and Neighbor Table should be checked for consistency, and updated if necessary. The OTA client changing the address could also unicast the device announce message Device_annce or APS Device Update command to the OTA server—in addition to the broadcasted Device_annce message. This to overcome the above-mentioned problem that a broadcast from the OTA client may not reach the OTA server. Unicast from the client, used for ImageBlock request, seems to be assumed to be working reliably.

Further, the requirement on the OTA server to drop an Image request command arriving from an unknown network or short address may be relaxed (after timeout). This may allow the OTA server to recover from the current problem by just accepting the new networks address of the OTA client device in the ongoing OTA upgrade. This may also be applied when the OTA client getting unpowered or loosing connection in the middle of the update, as the other clients may also track the timeout and, based on an selection algorithm, send the Image Request instead.

In the case of an OTA client power outage or reset during an ongoing OTA upgrade of an OTA client selected by the OTA server and if that OTA client is not operating for a longer time, the OTA server may select another client for upgrade, and preferably starting where the OTA server left off with the rebooting client. The rebooting device, when again in operation, could still restore the blocks and continue collecting the incoming packets.

In addition, if it is the OTA server that gets power-cycled in the middle of the OTA exchange, same may store persistently any information relating to the ongoing ITA upgrade, such as the network address of the current OTA client, the data blocks or data packets transmitted, etcetera.

Although not explicitly described above, OTA upgrade or update data blocks or data packets exchanged by the OTA server may comprise a block or packet number or identification and an identification of the total number of data blocks or data packets in a particular OTA upgrade.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus, the commissioning and/or control device, a luminaire device, a lighting system, the method, and the computer program product of the above aspects may have similar and/or identical preferred embodiments, in particular, as defined in the dependent claims.

It shall be understood that a preferred embodiment of the invention can also be any combination of the dependent claims or above embodiments with the respective independent claim.

The invention claimed is:

1. A method of performing an over-the-air (OTA) upgrade by a server in a network of communicatively interconnected client devices, wherein said server transmits a network address querying message if an ongoing OTA upgrade of a client device causes a timeout at said server, and wherein said server resumes said OTA upgrade of said client device after said server receives a network address reporting message of said client device comprising a current network address of the client device,
wherein said timeout is caused by receiving, at the server, a request for transmitting OTA upgrade data from the client device comprising a network address that does not match a network address of an OTA upgrade notification message transmitted by said server notifying said client device of said OTA upgrade.

2. The method according to claim 1, wherein said network address querying message comprises a Media Access Control (MAC) address of said client device.

3. The method according to claim 2, wherein said network address querying message is broadcasted by said server in said network.

4. The method according to claim 1, wherein said network address querying message is repeated by said server until a maximum number of repeats is exceeded.

5. The method according to claim 1, wherein said server resumes said OTA upgrade of said client device by transmitting, based on said received current network address of said client device, an OTA upgrade notification message notifying said client device of said OTA upgrade.

6. The method according to claim 5, wherein said OTA upgrade notification message, based on said received current network address of said client device, is transmitted in unicast mode from said server to said client device.

7. A non-transitory computer readable medium comprising computer program code instructions which, when run by a processor, causes said processor to perform the method of claim 1.

8. A method of performing an over-the-air (OTA) upgrade by a client device with a server in a network of communicatively interconnected devices, wherein in an ongoing OTA upgrade said client device transmits a network address reporting message comprising a current network address of the client device in response to receipt of a network address querying message from said server,
wherein the network address querying message was transmitted due to a timeout at said server, wherein said timeout is caused by receiving, at the server, a request for transmitting OTA upgrade data from the client device comprising a network address that does not match a network address of an OTA upgrade notification message transmitted by said server notifying said client device of said OTA upgrade.

9. The method according to claim 8, wherein said network address reporting message is repeated by said client device until a maximum number of repeats is exceeded.

10. The method according to claim 8, wherein the client device records received OTA upgrade data packages and a current OTA upgrade status in a non-volatile storage, and wherein said client device resumes said OTA upgrade after receipt of an OTA upgrade notification message from server notifying the client device of said OTA upgrade.

11. A server for performing an over-the-air (OTA) upgrade in a network of communicatively interconnected client devices, wherein said server comprises at least one hardware processor that is configured to transmit a network address querying message on condition that an ongoing OTA upgrade of a client device causes a timeout at said server, and resume said OTA upgrade of said client device after said server receives a network address reporting message of said client device comprising a current network address of the client device,
wherein said timeout is caused by receiving, at the server, a request for transmitting OTA upgrade data from the client device comprising a network address that does not match a network address of an OTA upgrade notification message transmitted by said server notifying said client device of said OTA upgrade.

12. A client device comprising at least one hardware processor for performing an over-the-air (OTA) upgrade with a server in a network of communicatively interconnected devices, wherein the processor is configured to, in an ongoing OTA upgrade of said client device, transmit a network address reporting message comprising a current network address of the client device in response to receipt of a network address querying message from said server,
wherein said timeout is caused by receiving, at the server, a request for transmitting OTA upgrade data from the client device comprising a network address that does not match a network address of an OTA upgrade notification message transmitted by said server notifying said client device of said OTA upgrade.

13. A lighting device comprising the client device of claim 12.

* * * * *